(12) United States Patent
Weber et al.

(10) Patent No.: US 12,724,599 B2
(45) Date of Patent: Sep. 1, 2026

(54) ENERGY MANAGEMENT PLATFORM

(71) Applicant: Inventus Holdings, LLC, Juno Beach, FL (US)

(72) Inventors: Alexander Heiko Weber, Hamburg (DE); Nicholas D. Schober, Minneapolis, MN (US); Benjamin D. Grindy, Minneapolis, MN (US); Justin D. Voyt, Woodbury, MN (US); Matthew D. Briercliffe, Corcoran, MN (US)

(73) Assignee: Inventus Holdings, LLC, Juno Beach, FL (US)

( * ) Notice: Subject to any disclaimer, the term of this patent is extended or adjusted under 35 U.S.C. 154(b) by 293 days.

(21) Appl. No.: 18/474,663

(22) Filed: Sep. 26, 2023

(65) Prior Publication Data

US 2024/0248705 A1 Jul. 25, 2024

Related U.S. Application Data

(60) Provisional application No. 63/481,405, filed on Jan. 25, 2023.

(51) Int. Cl.
*G06F 8/65* (2018.01)
*G06F 8/71* (2018.01)

(52) U.S. Cl.
CPC . *G06F 8/65* (2013.01); *G06F 8/71* (2013.01)

(58) Field of Classification Search
CPC .................................... G06F 8/65; G06F 8/71
See application file for complete search history.

(56) References Cited

U.S. PATENT DOCUMENTS

| | | | | |
|---|---|---|---|---|
| 9,311,457 | B1 * | 4/2016 | Thirthala | G06F 21/12 |
| 9,846,899 | B1 * | 12/2017 | Stickle | G06Q 30/06 |
| 11,507,364 | B2 | 11/2022 | Duvur et al. | |
| 2008/0244557 | A1 * | 10/2008 | Yeung | H04L 41/20 717/173 |
| 2011/0047540 | A1 * | 2/2011 | Williams | G06F 8/61 715/740 |

(Continued)

FOREIGN PATENT DOCUMENTS

| | | | | |
|---|---|---|---|---|
| CN | 114840226 A | * | 8/2022 | G06F 8/63 |
| WO | WO-2021133478 A1 | * | 7/2021 | H04L 9/3236 |

*Primary Examiner* — Daxin Wu
(74) *Attorney, Agent, or Firm* — Fish & Richardson P.C.

(57) ABSTRACT

A non-transitory machine-readable medium includes machine-readable instructions for a cloud computing system. The system comprises a licensing manager that stores licensing data for a plurality of software application projects, authorizing particular accounts to access a subset of the projects. An application marketplace receives a compiled version of a given software application project and licensing information for the project, including a helm chart, a docker image and a version number. The licensing information identifies particular accounts authorized to instantiate the given software application project, and the licensing manager updates the licensing data. An application controller spawns an instance of the given software application project in the cloud computing system in response to a request from a computing platform and verification that the request is associated with an authorized account.

19 Claims, 6 Drawing Sheets

(56) References Cited

U.S. PATENT DOCUMENTS

| | | | | |
|---|---|---|---|---|
| 2014/0149973 | A1* | 5/2014 | Walter | G06F 8/654 717/170 |
| 2015/0235015 | A1* | 8/2015 | Holler | H04L 67/5683 709/213 |
| 2019/0034315 | A1* | 1/2019 | Acosta | G06F 8/658 |
| 2021/0141891 | A1* | 5/2021 | Weinzettl | H04L 9/50 |
| 2021/0157978 | A1* | 5/2021 | Haramati | G06F 40/177 |
| 2022/0164177 | A1* | 5/2022 | Walkes | G06F 9/45558 |
| 2022/0350864 | A1* | 11/2022 | Tyagi | G06F 11/3409 |
| 2022/0398188 | A1 | 12/2022 | Leasck et al. | |
| 2023/0342125 | A1* | 10/2023 | Pieczul | G06F 8/43 |
| 2024/0015163 | A1* | 1/2024 | Costa, Jr. | G06F 9/547 |

* cited by examiner

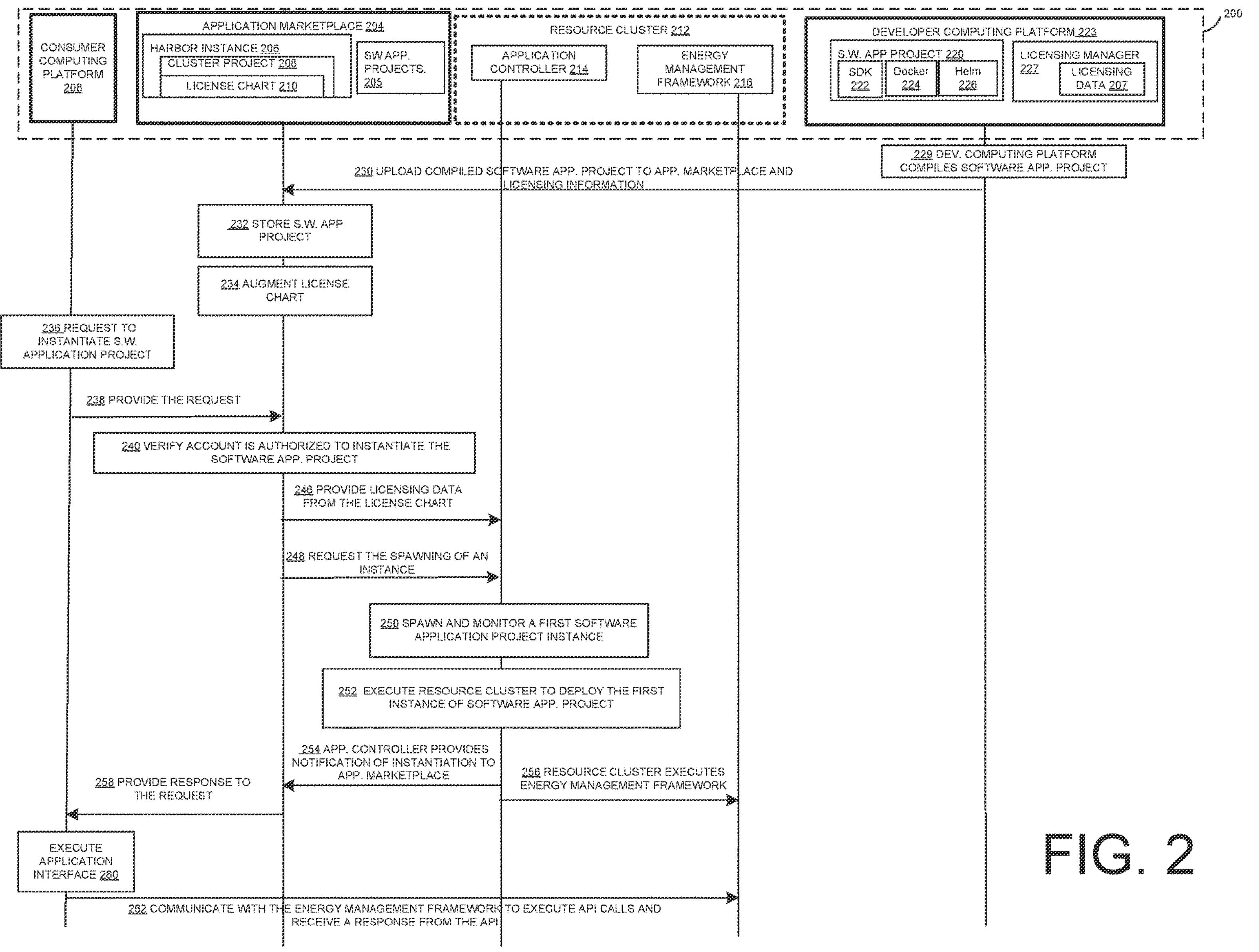
200
CONSUMER COMPUTING PLATFORM 208
APPLICATION MARKETPLACE 204
HARBOR INSTANCE 206
CLUSTER PROJECT 208
LICENSE CHART 210
SW APP. PROJECTS. 205
RESOURCE CLUSTER 212
APPLICATION CONTROLLER 214
ENERGY MANAGEMENT FRAMEWORK 216
DEVELOPER COMPUTING PLATFORM 223
S.W. APP PROJECT 220
SDK 222
Docker 224
Helm 226
LICENSING MANAGER 227
LICENSING DATA 207
229 DEV. COMPUTING PLATFORM COMPILES SOFTWARE APP. PROJECT
230 UPLOAD COMPILED SOFTWARE APP. PROJECT TO APP. MARKETPLACE AND LICENSING INFORMATION
232 STORE S.W. APP PROJECT
234 AUGMENT LICENSE CHART
236 REQUEST TO INSTANTIATE S.W. APPLICATION PROJECT
238 PROVIDE THE REQUEST
240 VERIFY ACCOUNT IS AUTHORIZED TO INSTANTIATE THE SOFTWARE APP. PROJECT
246 PROVIDE LICENSING DATA FROM THE LICENSE CHART
248 REQUEST THE SPAWNING OF AN INSTANCE
250 SPAWN AND MONITOR A FIRST SOFTWARE APPLICATION PROJECT INSTANCE
252 EXECUTE RESOURCE CLUSTER TO DEPLOY THE FIRST INSTANCE OF SOFTWARE APP. PROJECT
254 APP. CONTROLLER PROVIDES NOTIFICATION OF INSTANTIATION TO APP. MARKETPLACE
256 RESOURCE CLUSTER EXECUTES ENERGY MANAGEMENT FRAMEWORK
258 PROVIDE RESPONSE TO THE REQUEST
EXECUTE APPLICATION INTERFACE 280
262 COMMUNICATE WITH THE ENERGY MANAGEMENT FRAMEWORK TO EXECUTE API CALLS AND RECEIVE A RESPONSE FROM THE API
FIG. 2

ENERGY MANAGEMENT PLATFORM

CROSS-REFERENCE TO RELATED APPLICATION

This application claims the benefit of priority to U.S. Provisional Application No. 63/481,405, filed on 25 Jan. 2023 the entirety of which is herein incorporated by reference.

TECHNICAL FIELD

This disclosure relates to a software framework to enable a software marketplace for energy management software applications and other types of applications.

BACKGROUND

In computer science, a software framework is a generalization in which software providing common functionality can be selectively changed by additional user-written code, thus providing application-specific software. A software framework provides a standard way to build and deploy applications. A software framework is a universal, reusable software environment that provides particular functionality as part of a larger software platform to facilitate development of software applications, products and solutions. Software frameworks may include support programs, compilers, code libraries, tool sets, and application programming interfaces (APIs) that bring together all the different components to enable development of a project or system.

An API is a set of routines, protocols, and tools for building software applications. An API expresses a software component in terms of operations, inputs, outputs and underlying types. An API defines functionalities that are independent of their respective implementations, which allows definitions and implementations to vary without compromising the interface.

An app store (or app marketplace) is a type of digital distribution platform for computer software called applications. Software applications provide a specific set of functions which, by definition, do not include the running of the computer itself. Complex software designed for use on a personal computer, for example, may have a related application designed for use on a mobile device. Applications are designed to run on a specific operating system such as iOS, macOS, Windows, Linux or Android.

SUMMARY

A first example relates to a non-transitory machine-readable medium having machine-readable instructions for a cloud computing system including a licensing manager, causing one or more processor cores of the cloud computing system to execute operations. The operations for the licensing manager include storing licensing data for a plurality of software application projects. The licensing data authorizes particular accounts to access a subset of the plurality of software application projects. The machine-readable instructions also include an application marketplace, causing the one or more processor cores of the cloud computing system to execute operations including receiving a compiled version of a given software application project of the plurality of software application projects and receiving licensing information for the given software application project. The given software application project includes a helm chart, a docker image and a version number for the given software application project. The operations for the application marketplace also include providing the licensing information for the given software application project to the licensing manager. The licensing information identifies particular accounts authorized to instantiate the given software application project, and the licensing manager updates the licensing data responsive to receiving the licensing information. The machine-readable instructions further include an application controller causing the one or more processor cores of the cloud computing system to execute operations including spawning an instance of the given software application project in the cloud computing system in response to a request from a computing platform. The operations of the application controller also include verifying that the request is associated with an account authorized by the licensing data to instantiate the given software application project.

A second example relates to a system for deploying applications in a cloud computing system with an application marketplace for a software orchestration system, including a memory for storing machine-readable instructions and a processor core for accessing the memory and executing the machine-readable instructions. The machine-readable instructions include a harbor instance, causing the processor core to execute operations including storing licensing data for a plurality of software application projects. The licensing data authorizes particular accounts to access a subset of the plurality of software application projects. The machine-readable instructions also include an application marketplace causing the processor core to execute operations including receiving a compiled version of a given software application project of the plurality of software application projects and receiving licensing data for the given software application project. The given software application project includes a helm chart, a docker image and a version number for the given software application project. The operations for the application marketplace include providing licensing information for the given software application project to the harbor instance. The licensing information identifies particular accounts authorized to instantiate the given software application project, and the harbor instance updates a licensing chart responsive to receiving the licensing information. The machine-readable instructions further include an application controller causing the processor core to execute operations including spawning an instance of the given software application project in the cloud computing system in response to a request from a computing platform and verification that the request is associated with an account authorized by the licensing data to instantiate the given software application project.

A third example relates to a method for spawning an instance of a software application project. The method includes receiving, at an application marketplace operating on a cloud computing system, a request to instantiate an instance of a particular version of a given software application project of software application projects available in an application marketplace. The method also includes verifying, by the application marketplace, that an account associated with the request is authorized to spawn the particular version of the given software application project based on licensing data stored in a licensing chart to instantiate the particular version of the given software application project in response to the request. The method includes spawning, by an application controller operating on the cloud computing system, an instance of the particular version of the given software application project in a resource cluster if the account associated with request is authorized to instantiate the given software application project. Resources allocated for the instance of the given software application project is based on a docker image and a helm chart of the given software application project.

BRIEF DESCRIPTION OF THE DRAWINGS

FIG. 2 illustrates a sequence diagram of an example of a system controlling instantiation of the software applications when an account is authorized.

DETAILED DESCRIPTION

Figure 1:
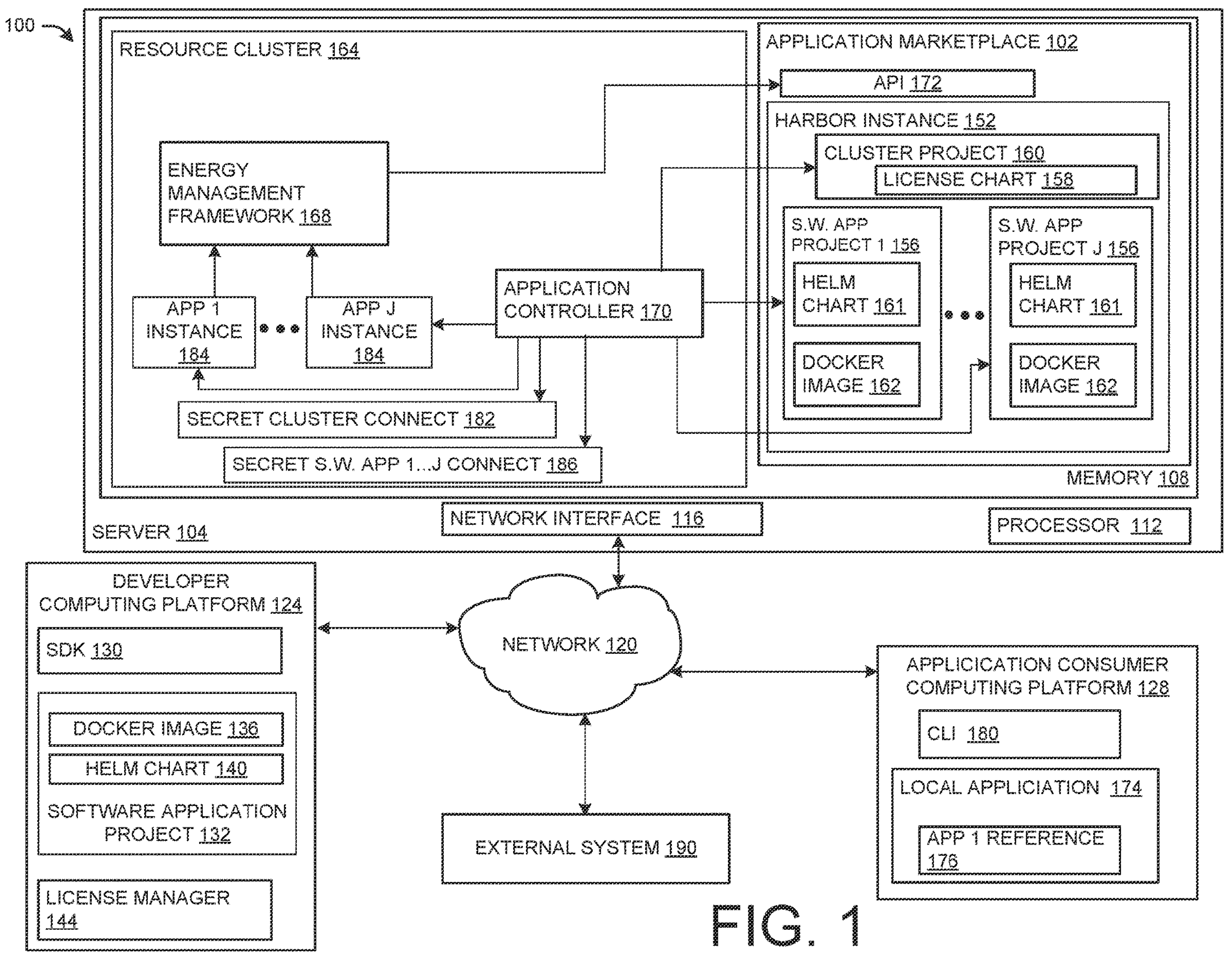
FIG. 1 illustrates an example of a system for controlling instantiation of software applications of a software marketplace.

This description relates to a system (e.g., a cloud computing system) with an application marketplace for a software orchestration system, such as Kubernetes. The system can include the application marketplace that receives software application projects from external computing platforms. The software application projects can be developed using a software development kit (SDK). The software application projects are compiled to include a docker image and a helm chart, and the software application projects are each assigned a version number. The docker image of the software application projects includes application code, libraries, tools, dependencies and other files needed to spawn an instance of the software application project. The helm chart of the software application projects defines a minimum amount of computing resources (e.g., memory, processor speed, databases, etc.) needed to spawn (execute) an instance of a software application corresponding to the software application project.

The application marketplace also receives licensing data for a licensing chart for the software application projects. The licensing data authorizes particular accounts to instantiate particular versions of a subset of the software application projects.

The system also includes an application controller executing on a resource cluster (e.g., a partition of the cloud computing system). The application controller controls and automates the deployment of desired application states within the resource cluster. In particular, the application controller can ensure that the proper resources (e.g., databases, memory and processor allocation, etc.) are available to execute selected applications. The application controller spawns an instance of a particular version of the software application of the software application projects in the marketplace in response to a request from a consumer computing platform and verification that the consumer computing platform is associated with an authorized account identified in the licensing data for the given software application. In some examples, the instance of the software application is a connector that can access data (e.g., retrieve data) from an external system.

Additionally, in some examples, the resource cluster can execute a software framework, such as an energy management framework for building and maintaining an energy management system (e.g., a power generation and/or power distribution system). In these examples, the application instances can execute application programming interface (API) calls to the energy management framework to cause the energy management framework to execute particular operations.

By employment of the system, tight version control of the application projects can be maintained. More particularly, the system enables a granular, per version, authorization of software projects by leveraging the license chart. Furthermore, in examples where an energy management framework is included, application projects can be added to the application marketplace and/or application instances can be spawned without requiring a change to the energy management framework. In this manner, a plethora of software application projects can be developed by first parties and third parties of the resource cluster.

FIG. 1 illustrates an example of a system 100 for controlling instantiation (spawning) of software applications of an application marketplace 102. The system 100 can include a server 104 (e.g., a computing platform) that can include a memory 108 for storing machine-readable instructions and data and a processor 112 for accessing the memory 108 and executing the machine-readable instructions. The memory 108 represents a non-transitory machine-readable medium, such as random-access memory (RAM), a solid state drive, a hard disk drive or a combination thereof. The processor 112 (alternatively referred to as a processing unit) can be implemented as one or more processor cores. The server 104 can include a network interface 116 (e.g., a network interface card) configured to communicate with other computing platforms via a network 120, such as a public network (e.g., the Internet), a private network (e.g., a local area network (LAN)) or a combination thereof (e.g., a virtual private network).

The server 104 could be implemented in a computing cloud. In such a situation, features of the server 104, such as the processor 112, the network interface 116, and the memory 108 could be representative of a single instance of hardware or multiple instances of hardware with applications executing across the multiple of instances (i.e., distributed) of hardware (e.g., computers, routers, memory, processors, or a combination thereof). Alternatively, the server 104 could be implemented on a single dedicated server or workstation.

Other computing platforms (e.g., computing devices) of the system 100 also communicate on the network 120. These other computing devices include a developer computing platform 124 (e.g., an application developer computing platform) and an application consumer computing platform 128. For purposes of simplification of explanation, details of the developer computing platform 124 and the application consumer computing platform 128 are omitted. However, it is understood that the developer computing platform 124 and/or the application consumer computing platform 128 can be implemented in a similar manner as the server 104. In fact, in some examples, the server 104 and the developer computing platform 124 and/or the data consumer computing platform 128 are operating on the same computing device. Unless otherwise indicated, it is presumed that the modules of the developer computing platform 124 and the application consumer computing platform 128 are stored in a non-transitory memory that is access by a processing unit (e.g., one or more processing cores).

The developer computing platform 124 includes a software development kit (SDK) 130 for creating and compiling a software application project 132 (or multiple software application projects), which are alternatively referred to as application software or more simply as apps. The software application project 132 generated by the developer computing platform 124 includes a docker image 136 and a helm chart 140. The docker image 136 includes application code, libraries, tools, dependencies and other files needed to spawn (e.g., execute) an instance of the software application project 132. The helm chart 140 defines a minimum amount of computing resources (e.g., memory, processor speed, databases, etc.) needed to spawn the instance of the software application project 132. The software application project 132 also includes a version number that identifies a particular version for the software application project 132. In various examples, there are multiple versions of the software application project 132, but in some examples, there could be a single version of the software application project 132.

The developer computing platform 124 can also execute a license manager 144. The license manager 144 can provide license data that identifies accounts (e.g., user accounts) that are authorized to execute instances of the software application project 132. Stated differently, the license data associates the accounts with a particular version of the software application project 132 generated and compiled by the developer computing platform 124 with the assistance of the SDK 130. In many instances, there are multiple versions of a software application. The license manager 144 allows the accounts (or other entities) to be associated with these particular versions or some subset thereof. For instance, suppose that the license data indicates that a given account is authorized to execute up two (2) instances of version 3.2 of the software application project 132 or below. In this situation, there may be versions below 3.2 that are allowed to be executed by the given account. Alternatively, suppose that the license data authorizes the given user account to execute a single instance of any version of the software application project 132 (e.g., in a software subscription service). In this case, when and if the software application project 132 is updated by the SDK 130, the given account is authorized to execute a single instance of the newly updated version of the software application project 132.

In response to compilation of the software application project 132 and generation of the licensing data by the license manager 144, the developer computing platform 124 (or another computing platform) can upload the software application project 132 to the server 104 via the network 120. More specifically, the developer computing platform 124 can upload the software application project 132 to the application marketplace 102 stored in the memory 108 of the server 104. The application marketplace 102 is implemented as a deployed container, such as a container deployed and monitored by a container orchestration system (e.g., Kubernetes). The application marketplace 102 executes a harbor instance 152. The harbor instance 152 is a container register that stores and maintains J number of software application projects 156, where J is an integer greater than or equal to one (1), labeled "S.W. APP PROJECT 1" . . . "S.W. APP. PROJECT J". Additionally, the developer computing platform 124 can upload licensing data provided from the license manager 144 to the application marketplace 102. In response, the application marketplace 102 can augment a license chart 158 with the license data. The license chart 158 can be implemented on a cluster project 160 of the harbor instance 152.

Each software application project 156 can include a helm chart 161 and a docker image 162. Each helm chart 161 can be implemented in a similar manner as the helm chart 140 of the software application project 132 generated by the developer computing platform 124. Similarly, each docker image 162 can be implemented in a similar manner as the docker image 136 of the software application project 132 of the developer computing platform 124. Thus, each docker image 162 includes application code, libraries, tools, dependencies and other files needed to spawn an instance of the corresponding software application project 156. Similarly, each helm chart 161 defines a minimum amount of computing resources (e.g., memory, processor speed, databases, etc.) needed to execute the corresponding software application project 156.

The memory 108 of the server 104 can also include a resource cluster 164. The resource cluster 164 represents resources (e.g., cloud computing resources) allocated for a particular account (e.g., a customer or other account). That is, the resource cluster 164 provides resources for executing software applications dictated by the particular account. The resource cluster 164 is controlled and maintained by the container orchestration system.

The resource cluster 164 includes an energy management framework 168. The energy management framework 168 includes software modules for retrieving and processing data related to energy management, such as weather data, energy marketplace data, etc. It is understood that in other examples, other types of frameworks are employable in place of and/or in addition to the energy management framework 168. In some examples, the energy management framework 168 is omitted. The energy management framework 168 invokes and manages an application programming interface (API) 172, such as a graph and query manipulation language (GraphQL) API. The API 172 allows external systems to activate operations of the energy management framework 168 and/or to retrieve data from the energy management framework 168.

The resource cluster 164 also includes an application controller 170. The application controller 170 controls and automates the deployment of desired application states within the resource cluster 164. In particular, the application controller 170 can ensure that the proper resources (e.g., databases, memory and processor allocation, etc.) are available to execute selected applications.

The application consumer computing platform 128 can communicate with the application controller 170 of the resource cluster 164. The application consumer computing platform 128 can execute a local application 174. The local application 174 can be programmed to include an application reference 176, such as a reference to the first software application project (software application project 1 156). As one example, the local application 174 can communicate with a command line interface (CLI) 180 to interface with the energy management framework 168.

The local application 174 can activate the application reference 176. In response, the application reference 176 can communicate with the application controller 170. More particularly, the application reference 176 can provide a request to the application controller 170 that the first software application project 156 be instantiated. As noted, the first software application project 156 may be a particular version of a software application. In response to the request, the application controller 170 can access the license chart 158 of the cluster project 160 to determine if a given account of the application consumer computing platform 128 is authorized to instantiate the first software application project 156. As noted, the license chart 158 could indicate the particular version(s) of the first software application project 156 that the given account is authorized to instantiate and/or a number of instances of the first software application project 156 that the given account is authorized to instantiate. In some examples, the application controller 170 accesses a secret cluster connect 182 stored in the resource cluster 164 that contains secure data (e.g., encryption keys) for communicating with the cluster project 160.

Presuming that the given account associated with the application consumer computing platform 128 is authorized to instantiate the first software application project 156, the application controller 170 can spawn and monitor the first software application project 156, thereby forming a first application instance 184 (App 1 instance) in the resource cluster 164. In particular, the application controller 170 can employ the docker image 162 and the helm chart 161 of the first software application project 156 to spawn the resource cluster 164. Accordingly, in this manner, the first application instance 184 can execute as a software-as-a-service (SaaS) within the resource cluster 164. In some examples, the application controller 170 can access a secret application connect 186 for the first software application project 156 that is stored in the resource cluster 164. The secret application connect 186 for the first software application project 156 can represent secure data needed to ensure proper execution of the first application instance 184.

In a similar manner, other (or the same) application consumer computing platforms 128 can include an application reference to each of the 2 to J number of software application projects 156, or some subset thereof. Thus, in a similar manner, the application controller 170 can spawn and monitor various application instances 184 of the J number of application projects 156. In each such spawn and monitor operation, the application controller 170 can verify that an account associated with a requesting consuming computing platform (e.g., the application consumer computing platform 128) is authorized to instantiate a corresponding software application project 156. Further, additional secret (e.g., secure data) can be stored in the resource cluster 164 as a secret application connect 186.

The J number of application instances 184 are containerized applications. In operation, the J number of application instances 184 can employ API calls to initiate operations on the energy management framework 168. Additionally, the API 172 allows the energy management framework 168 to retrieve data from the external systems for the J number of application instances 184, or some subset thereof. Further, in some examples, a subset (e.g., some or all) of the J number of application instances 184 can be connector applications that can communicate with an external system 190 (or multiple external systems) to retrieve data. In examples where the resource cluster 164 is implemented in an energy management system, the data from the external system 190 could be related to weather patterns (e.g., weather data), power usage data (e.g., peak time information) and/or energy marketplace data (e.g., data related to a current trading cost for energy). This list is not meant to be exhaustive. In other examples, additional or alternative types of data can be retrieved by the subset of the J number of application instances 184.

Further, in some examples, the local application 174 can employ the CLI 180 to communicate with the energy management framework 168 to execute API calls. In some instances, these API calls are answered with data from some or all of the J number of application instances. In a similar manner, in some examples, the local application 174 can receive data from the J number of application instances 184 (or some subset thereof) through the CLI 180 and/or the application reference 176.

By employment of the system 100, tight control over the instantiation of the J number of software projects 156 can be attained. In particular, inclusion of the licensing data included in the license chart 158 ensures that the application instances 184 are only spawned for licensed accounts. This also allows for tight version control of the software application projects 156. That is, the license chart 158 can be granular to allow certain accounts to spawn certain versions of the J number of software application projects.

Furthermore, the application controller 170 and the application marketplace 102 can operate in concert to allow changes to the resource cluster 164 (e.g., spawning application instances 184) without requiring changes to the energy management framework 168. That is, there is no need to recompile the energy management framework 168 when a software application project 156 is added to the application marketplace 102 or when an application instance 184 is spawned. Furthermore, if one (or more) of the J number of application instances 184 crashes, this crash does not cause the energy management framework 168 to crash. Stated differently, the energy management framework 168 executes before, during and after a spawning of the J number of application instances 184. Similarly, if a failure occurs during the spawning of the given software application instance 184, the energy management framework 168 continues to execute before, during and after the failure is detected, and a re-spawning occurs. In this manner, various parties, including third party tenants of the resource cluster 164 and/or the application marketplace 102, can develop and deploy software application projects (e.g., the J number of software application projects 156 or some subset thereof) for the application marketplace 102.

FIG. 2 illustrates a sequence diagram as an example of a system 200 (e.g., cloud computing system 100 of FIG. 1) with an application marketplace 204 (e.g., the application marketplace 102 of the system 100) for a software orchestration system, such as Kubernetes. The application marketplace 204 is stored in the memory of a server (e.g., a cloud server) and implemented as a deployed container. The application marketplace 204 is deployed and monitored by a container orchestration system (e.g., Kubernetes) and further executes a harbor instance 206 (e.g., the harbor instance 152 of FIG. 1), a container register to store and maintain J number of software application projects 205 (e.g., J number of software application projects 156), where J is an integer greater than or equal to 1, labeled "S.W. APP PROJECT J." A consumer computing platform 208 (e.g., the consumer computing platform 128 of FIG. 1) communicates with an application controller 214 (e.g., the application controller 170 of FIG. 1) of a resource cluster 212 (e.g., the resource cluster 164). The harbor instance 206 executes a cluster project 209 (e.g., the cluster project 160) that stores a license chart 210 (e.g., the license chart 158).

A software application project 220 can be developed using a software development kit (SDK) 222 that executes on a developer computer platform 223 (e.g., the developer computing platform 124). The software application project 220 contains a docker image 224 (e.g., the docker image 162) and a helm chart 226 (e.g. the helm chart 161). The software application project 220 also has an assigned version number. The docker image 224 of the software application project 220 includes application code, libraries, tools, dependencies and other files needed to spawn an instance of the software application project. The helm chart 226 of the software application projects 220 defines a minimum amount of computing resources (e.g., memory, processor speed, databases, etc.) needed to spawn (execute) an instance of a software application corresponding to the software application project 220. The developer computing platform also includes a license manager 227 (e.g., the license manager 144) to store licensing data 207 generated for the software application project 220.

At 229, the developer computing platform compiles the software application project. The compilation process of the software application project transforms the source code of the application into a machine-readable format that can be executed by a computer. At 230, the developer computing platform 223 uploads the compiled software application project 220 to the application marketplace 204 that identifies a particular version of the software application project 220 and licensing information characterized by the licensing data 207 to the application marketplace 204.

At 232, the application marketplace 204 stores the compiled software project as one of the J number of software projects 205. At 234, the application marketplace 204, in response to receiving the licensing information associated with the compiled software application project provided by the developer computing platform 223, augments the license chart 210 with the licensing information.

At 236, the consumer computing platform 208 provides a request to instantiate the software application project 220. At 238, the consumer computing platform 208 provides the request to the application marketplace 204. At 240, the application marketplace 204 verifies the account associated with the consumer computing platform 208 is authorized to instantiate the software application project 220. At 246, the application marketplace 204 provides licensing data from the license chart 210 to the resource cluster 212. The license chart 210 could indicate the particular version(s) of the software application project 220 that the given account is authorized to instantiate and/or a number of instances of the software application project 220 that the given account is authorized to instantiate.

At 248, the application marketplace 204 requests the application controller 214 spawn an instance of the first software application project 220. At 250, in response to the request, the consumer computing platform 208 associated with an authorized account causes the application controller 214 to spawn an instance of the particular version of the software application project 220 and then monitor the first software application project 220. At 252, the application controller 214 executes the resource cluster 212 to deploy the first instance of the software application project 220. At 254, the application controller 214 provides a notification of instantiation to the application marketplace 204.

At 256, the energy management framework 216 of the resource cluster 212 retrieves energy management data pertaining to weather conditions, energy marketplace data, etc. At 258, the application marketplace 204 provides a response to the request from the consumer computing platform 208. At 260, the consumer computing platform 208 can execute an interface (e.g., a GUI) for the instance of the software application project 220, such as an application that includes a reference to the instance of the software application project 220.

At 262, the consumer computing platform can communicate with the energy management framework 216 responsive to execution of an application interface to execute an application programming interface (API) and receive a response (e.g., data) from the API. In some examples, the consumer computing platform can communicate with the energy management framework by employing the command line interface (CLI) and use query language to extract and retrieve data. The software application project 220, which was access through the application interface, updates automatically when data is received from the API without having to re-instantiate the software application project 220.

Figure 3:
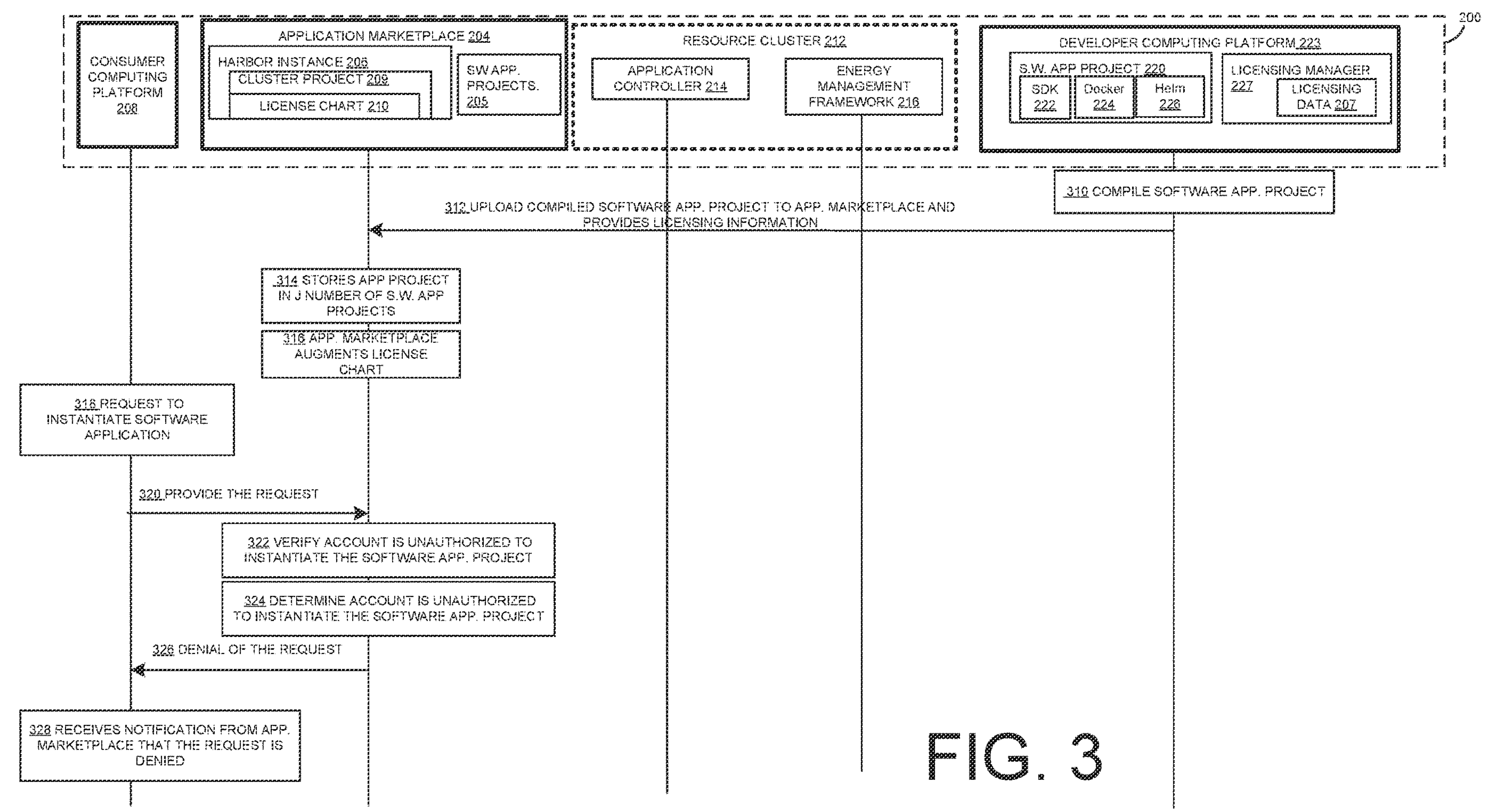
FIG. 3 illustrates a sequence diagram of an example of a system controlling instantiation of the software applications when the given account is unauthorized to instantiate the software application.

FIG. 3 illustrates another sequence diagram for the system 200 (e.g., the system 200 of FIG. 2). For purposes of simplification, FIGS. 2 and 3 employ the same reference numbers to denote the same structure. Additionally, some features are not re-introduced.

At 310, the developer computing platform compiles the software application project. The compilation process of the software application project transforms the source code of the application into a machine-readable format that can be executed by a computer. At 312, the developer computing platform 223 uploads the compiled software application project 220 to the application marketplace 204 and provides licensing information that identifies a particular version of the software application project 220 to the application marketplace 204.

At 314, the application marketplace 204 stores the software application project 220 in the J number of software application projects 205. At 316, the application marketplace 204, in response to receiving the licensing information associated with the compiled software application project 220 provided by the developer computing platform 223, augments a license chart 210 with the licensing information characterizing the licensing data.

At 318, the consumer computing platform 208 requests to instantiate the software application project 220. The instantiation process involves setting up the initial structure and configuration for a new software project to build the desired software application. At 320, the consumer computing platform 208 provides the request to the application marketplace 204. At 322, the application marketplace 204 verifies the account associated with the consumer computing platform 208 is authorized to instantiate the software application project 220.

In response to the request, the application marketplace 204 examines the licensing data from the licensing chart 210 to determine if a given account associated with the consumer computing platform 208 is authorized to instantiate the first software application project 220 (e.g., the first software application project 156). As noted, the license chart 210 could indicate the particular version(s) of the software application project 220 that the given account is authorized to instantiate and/or a number of instances of the software application project 220 that the given account is authorized to instantiate. Accordingly, at 324, the application marketplace 204 determines that the account associated with the consumer computing platform 208 is unauthorized to instantiate the particular version of the software application project 220.

At 326, the application marketplace 204, in response to not being able to authenticate the request from the account associated with the consumer computing platform 208, sends a denial of the request for an unauthorized account and sends a notification to the consumer computing platform 208 the account is unauthorized. At 328, the consumer computing platform 208 receives the notification that the request is denied.

Figure 4:
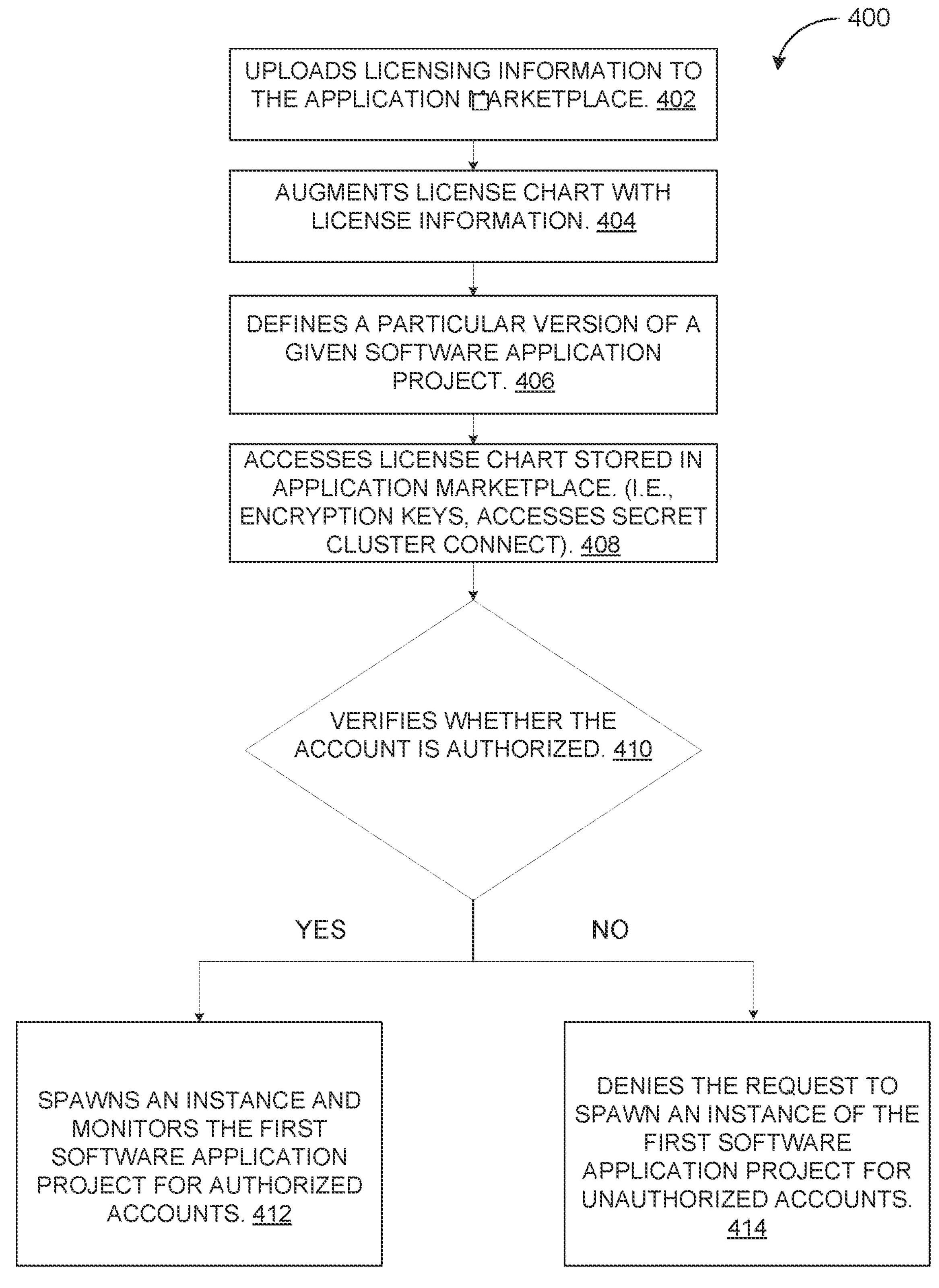
FIG. 4 illustrates a flow chart of an example method of verifying an account.

FIG. 4 illustrates a flow chart as an example method 400 for a system (e.g., cloud computing system) to verify the account associated with the consumer computing platform is authorized to instantiate the particular version of the given software application project. The method 400 can be implemented, for example, with the system 100 of FIG. 1. The system can include the application marketplace (e.g., the application marketplace 102) which receives software application projects from developer computing platforms (e.g., the software application project 132). The software application projects can be developed using a software development kit (SDK) (e.g., the SDK 130). The software application projects are compiled to include a docker image (e.g., the docker image 136) and a helm chart (e.g., the helm chart 140), and the software application projects are each assigned a version number. The docker image of the software application projects includes application code, libraries, tools, dependencies and other files needed to spawn an instance of the software application project. The helm chart of the software application projects defines a minimum amount of computing resources (e.g., memory, processor speed, databases, etc.) needed to spawn (execute) an instance of a software application corresponding to the software application project.

The developer computing platform (e.g. developer computing platform 124) can also execute a license manager (e.g. license manager 144). The license manager can provide license data that identifies accounts (e.g., user accounts) that are authorized to execute instances of the software application project. Stated differently, the license data associates the accounts with a particular version of the software application project generated and compiled by the developer computing platform with the assistance of the SDK. In many instances, there are multiple versions of a software application. The license manager allows the accounts (or other entities) to be associated with these particular versions or some subset thereof. For example, the account associated with the consumer computing platform may be authorized to instantiate version(s) J and K of the software application project where J and K are two different integer values.

At 402, the developer computing platform uploads the licensing information associated with the compiled software application project. The licensing information identifies a particular version of the software application project. At 404, in response to receiving the licensing information from the developer computing platform, the application marketplace augments a license chart with the license information. At 406, the licensing chart authorizes particular accounts to instantiate particular versions of the software application projects. In particular, inclusion of the licensing information included in the license chart ensures that the application instances are only spawned for licensed accounts.

At 408, the resource cluster accesses the license chart stored in the application marketplace (e.g., the application marketplace 204 of FIG. 2 provides licensing data from the license chart to the resource cluster 212 at 246). At 410, the application marketplace makes a determination as to whether the account is authorized to instantiate particular versions of the software application project. If the determination at 410 is positive (e.g., YES), the method 400 proceeds to 412. If the determination at 410 is negative (e.g., NO), the method 400 proceeds to 414.

At 412, the application controller spawns an instance and monitoring the first software project. At 414, the application controller denies the request to spawn an instance of the first software application project for unauthorized accounts. The operations at 414 may occur, for example because the account associated with the consumer computing platform is unauthorized to instantiate the particular version of the software application project.

Figure 5:
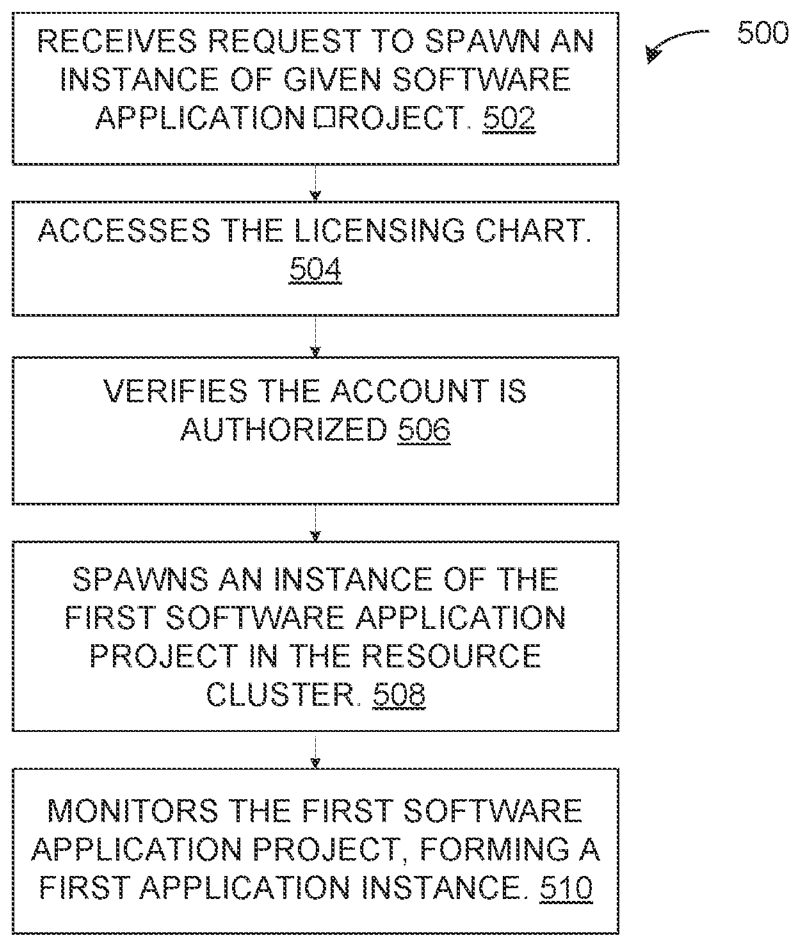
FIG. 5 illustrates a flow chart of an example method for spawning an instance of a software application from an application marketplace.

FIG. 5 illustrates an example method 500 for a system (e.g., cloud computing system 100 of FIG. 1) to spawn an instance of a software application stored in an application marketplace. The method 500 can be implemented, for example, with the system 100 of FIG. 1. The system includes an application marketplace for a software orchestration system, such as Kubernetes. The system can include the application marketplace (e.g., the application marketplace 102) which receives software application projects from developer computing platforms (e.g., the software application project 132). The software application projects can be developed using a software development kit (SDK) (e.g., the SDK 130). The software application projects are compiled to include a docker image (e.g., the docker image 136) and a helm chart (e.g., the helm chart 140), and the software application projects are each assigned a version number. The docker image of the software application projects includes application code, libraries, tools, dependencies and other files needed to spawn an instance of the software application project. The helm chart of the software application projects defines a minimum amount of computing resources (e.g., memory, processor speed, databases, etc.) needed to spawn (execute) an instance of a software application corresponding to the software application project.

The system also includes an application controller executing on a resource cluster (e.g., a partition of the cloud computing system). The application controller controls and automates the deployment of desired application states within the resource cluster. In particular, the application controller can ensure that the proper resources (e.g., databases, memory and processor allocation, etc.) are available to execute selected applications.

At 502, an application controller (e.g., the application controller 214 of FIG. 2) operating on a resource cluster receives a request to instantiate an instance of a particular version of a given software application project (e.g., the software application project 220 of FIG. 2) of the software application projects available in an application marketplace. At 504, the application marketplace accesses the license chart containing the license information. At 506, to execute the verification process, the application marketplace accesses the license chart (e.g., the license chart 210 of FIG. 2) to verify the account associated with the request is authorized. The license chart specifies a number of instances of the given software application that the account associated with the request is authorized to spawn in response to requests to spawn the instance of the given software application project.

At 508, in response to the verification, an application controller spawns an application instance of the particular version software application project in a resource cluster. The spawning of the software application project is based on the computing resources defined docker image and a helm chart. At 510, the application controller monitors the software application project (e.g., the spawning and monitoring of the software application project 220 of FIG. 3).

Figure 6:
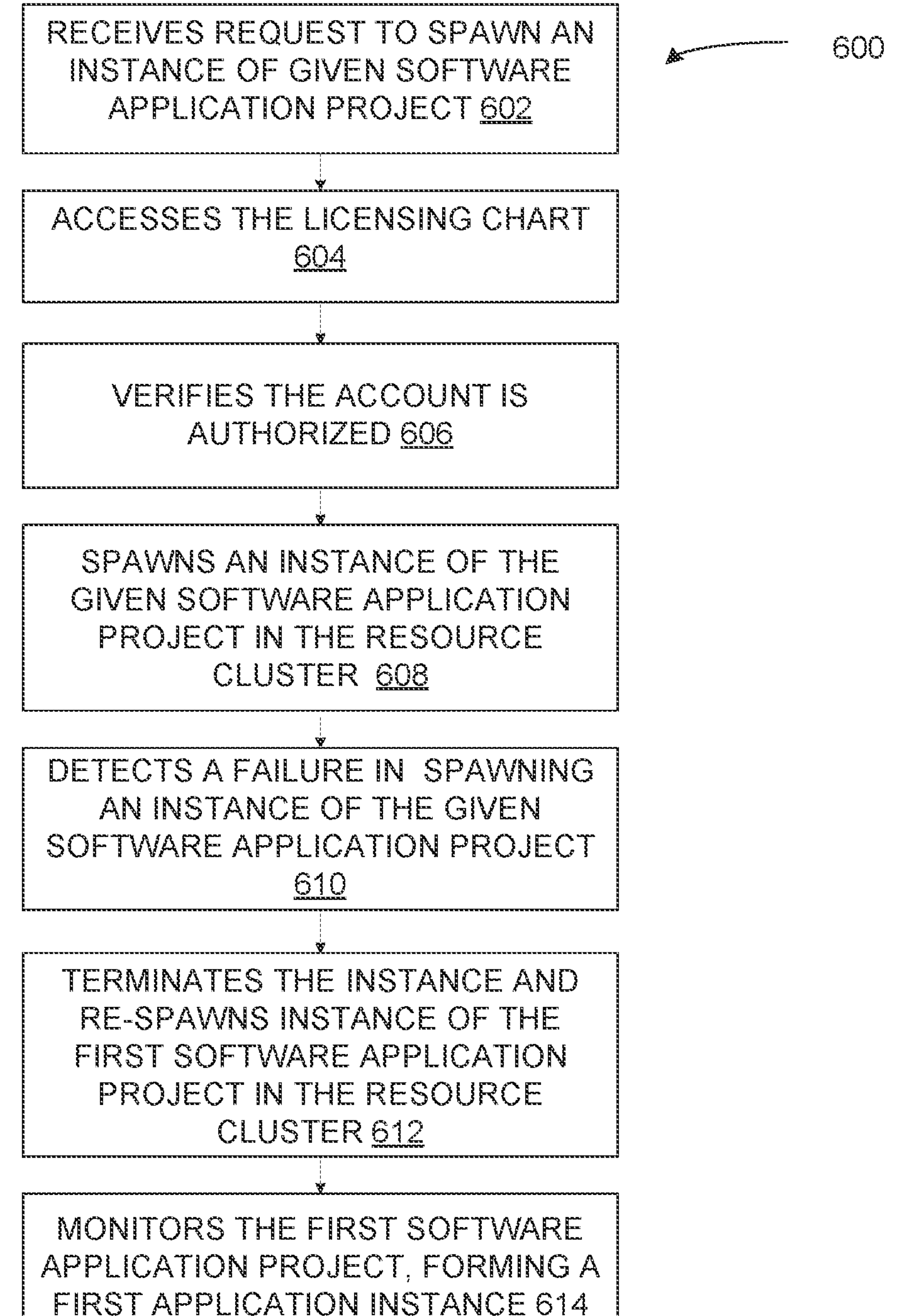
FIG. 6 illustrates a flowchart of an example method of a system that fails in the spawning of an instance of a software application stored in an application marketplace.

FIG. 6 illustrates a flowchart of an example method 600 of a system (e.g., cloud computing system 100 of FIG. 1) that fails in the spawning of an instance of a software application stored in an application marketplace.

At 602, an application controller (e.g., the application controller 170) on a computing platform (e.g., a cloud computing platform) receives a request to spawn an instance of a particular version of a given software application project (e.g., one of the software application projects 156) of the software application projects available in the application marketplace (e.g., the application marketplace 102).

At 604, in response to the request the application controller accesses a license chart (e.g., the license chart 210 of FIG. 2) stored in the application marketplace. The license chart specifies a number of instances of the given software application that the account associated with the request is authorized to spawn upon request to spawn the instance of the given software application project. In some instances, the account is unauthorized to instantiate upon request and does not spawn the instance of the given software application project.

At 606, the application marketplace verifies the account associated with the computing platform is authorized. At 608, in response to the verification, an application controller spawns an application instance of the particular version for the first software application project in the resource cluster. The spawning of the software application project is based on the computing resources defined docker image and a helm chart.

At 610, the application controller detects a failure in the spawning of an instance of a software application project. For example, failure may occur if there are network connectivity issues, service disruptions or outages from the cloud provider, template errors with the docker image or helm chart that incorrectly define the allocation of compute resources, and/or resource constraints when there is not enough memory, storage, or CPU to instantiate the software application project. At 612, the application controller terminates the spawning of the software application project, and the re-spawning process is initiated. At 614, in response to the successful instantiation of the software application project, the application controller monitors the software application project forming a first application instance. In some examples, an energy management framework (e.g., the energy management framework 168) also executes in the resource cluster. The energy management framework can executes before, during and after the detecting (at 610), the terminating and the re-spawning (at 612). That is, the failure (or success) of the spawning of the instance of the software application project does not impact (e.g., cause a crash or require recompilation) the operation of the energy management framework.

In view of the foregoing structural and functional description, those skilled in the art will appreciate that portions of the systems and method disclosed herein may be embodied as a method, data processing system, or computer program product such as a non-transitory computer readable medium. Accordingly, these portions of the approach disclosed herein may take the form of an entirely hardware embodiment, an entirely software embodiment (e.g., in a non-transitory machine-readable medium), or an embodiment combining software and hardware. Furthermore, portions of the systems and method disclosed herein may be a computer program product on a computer-usable storage medium having computer readable program code on the medium. Any suitable computer-readable medium may be utilized including, but not limited to, static and dynamic storage devices, hard disks, solid-state storage devices, optical storage devices, and magnetic storage devices.

Certain embodiments have also been described herein with reference to block illustrations of methods, systems, and computer program products. It will be understood that blocks of the illustrations, and combinations of blocks in the illustrations, can be implemented by computer-executable instructions. These computer-executable instructions may be provided to one or more processors of a general purpose computer, special purpose computer, or other programmable data processing apparatus (or a combination of devices and circuits) to produce a machine, such that the instructions, which execute via the one or more processors, implement the functions specified in the block or blocks.

These computer-executable instructions may also be stored in computer-readable memory that can direct a computer or other programmable data processing apparatus to function in a particular manner, such that the instructions stored in the computer-readable memory result in an article of manufacture including instructions which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

What have been described above are examples. It is, of course, not possible to describe every conceivable combination of structures, components, or methods, but one of ordinary skill in the art will recognize that many further combinations and permutations are possible. Accordingly, the invention is intended to embrace all such alterations, modifications, and variations that fall within the scope of this application, including the appended claims. Where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

What is claimed is:

1. A method for spawning an instance of a software application project, the method comprising:

receiving, at an application marketplace operating on a cloud computing system, a request to instantiate an instance of a particular version of a given software application project of software application projects available in an application marketplace;

verifying, by the application marketplace, that an account associated with the request is authorized to spawn the particular version of the given software application project based on licensing data stored in a licensing chart to instantiate the particular version of the given software application project in response to the request; and spawning, by an application controller operating on the cloud computing system, an instance of the particular version of the given software application project in a resource cluster if the account associated with request is authorized to instantiate the given software application project, wherein resources allocated for the instance of the given software application project is based on a docker image and a helm chart of the given software application project, and wherein the instance of the particular version of the given software application project invokes application programming interface (API) calls for the instance of the given software application project.

2. The method of claim 1, wherein the method further comprises denying, by the application marketplace, the spawning of the particular version of the given software application project if the account associated with the request is not authorized to spawn the instance of the particular version of the given software application project.

3. The method of claim 1, wherein the API calls are made to an energy management framework executing in the resource cluster.

4. The method of claim 3, wherein the spawning further comprises:

detecting, by the application controller a failure during the spawning of the instance of the particular version of the given software application project;

terminating the instance of the particular version of the given software application project in response to the detecting; and re-spawning the instance of the given software application project in response to the terminating.

5. The method of claim 4, wherein the energy management framework executes before, during and after the detecting, the terminating and the re-spawning.

6. The method of claim 5, wherein the energy management framework is configured to interface with an external software application in response to at least one of the API calls.

7. A non-transitory machine-readable medium having machine-readable instructions that, when executed by one or more processors of a cloud computing system, cause the one or more processors to perform operations comprising:

storing licensing data for a plurality of software application projects in a database, wherein the licensing data authorizes particular accounts to access a subset of the plurality of software application projects;

updating the licensing data responsive to receipt of licensing information, including associating particular accounts with specific versions of the plurality of software application projects;

receiving a compiled version of a given software application project of the plurality of software application projects and licensing information for the given software application project, wherein the given software application project includes a helm chart, a docker image and a version number for the given software application project;

providing the licensing information for the given software application project to update the licensing data, wherein the licensing information identifies particular accounts authorized to instantiate the given software application project;

spawning an instance of the given software application project in a resource cluster of the cloud computing system in response to a request from a computing platform;

accessing a license chart to verify that the request is associated with an account authorized by the licensing data to instantiate the given software application project;

monitoring the spawned instance of the given software application project; and invoking calls to an application programming interface (API) to retrieve data for the instance of the given software application project.

8. The non-transitory machine-readable medium of claim 7, wherein the operations further comprise augmenting the license chart with the licensing data to verify that the request is associated with only authorized accounts to instantiate the given software application project.

9. The non-transitory machine-readable medium of claim 8, wherein the license chart specifies a number of instances of the given software application project that the account associated with the request is authorized to spawn upon request to spawn the instance of the given software application project.

10. The non-transitory machine-readable medium of claim 9, wherein the license chart indicates a particular version of the given software application project that the account is authorized to instantiate upon request to spawn the instance of the given software application project.

11. The non-transitory machine-readable medium of claim 9, wherein the license chart indicates a particular version of the given software application project that the account is unauthorized to instantiate.

12. The non-transitory machine-readable medium of claim 7, wherein the helm chart of the given software application project defines a minimum set of computing resources for spawning the instance of the given software application project and the docker image of the given software application project contains application code, libraries, tools and dependencies for spawning the instance of the given software application project.

13. The non-transitory machine-readable medium of claim 7, wherein the resource cluster executes a software framework for an energy management system.

14. The non-transitory machine-readable medium of claim 13, wherein the energy management system executes before during and after the spawning of the instance of the given software application project in the cloud computing system.

15. The non-transitory machine-readable medium of claim 13, wherein the instance of the given software application project is spawned by an application marketplace that is deployed in a container and monitored by a container orchestration system.

16. A system for deploying applications in a cloud computing system, comprising:

one or more processors; and memory storing machine-readable instructions that, when executed by the one or more processors, cause the one or more processors to perform operations comprising:

storing licensing data for a plurality of software application projects in a cluster project, wherein the licensing data authorizes particular accounts to access a subset of the plurality of software application projects;

receiving a compiled version of a given software application project of the plurality of software application projects and licensing data for the given software application project, wherein the given software application project includes a helm chart, a docker image and a version number for the given software application project;

providing licensing information for the given software application project to update a licensing chart, wherein the licensing information identifies particular accounts authorized to instantiate the given software application project;

spawning an instance of the given software application project in a resource cluster of the cloud computing system in response to a request from a computing platform;

accessing the licensing chart to verify that the request is associated with an account authorized by the licensing data to instantiate the given software application project;

monitoring the spawned instance; and invoking calls to an application programming interface (API) to retrieve data for the instance of the given software application project.

17. The system of claim 16, wherein the given software application project is provided from a developer computing platform.

18. The system of claim 16, wherein an application consumer platform executes a local application that includes a reference to the instance of the given software application project.

19. The system of claim 16, wherein an application controller selects resources in a resource cluster for instantiating software application projects for particular accounts.

* * * * *